(12) United States Patent
Shahana et al.

(10) Patent No.: US 12,497,128 B2
(45) Date of Patent: Dec. 16, 2025

(54) HUMAN-POWERED VEHICLE CONTROL DEVICE AND HUMAN-POWERED VEHICLE CONTROL SYSTEM

(71) Applicant: Shimano Inc., Osaka (JP)

(72) Inventors: Satoshi Shahana, Osaka (JP); Akira Inoue, Osaka (JP); Akinobu Sugimoto, Osaka (JP); Atsuhiro Emura, Osaka (JP); Nobukatsu Hara, Osaka (JP); Hitoshi Takayama, Osaka (JP); Shingo Sakurai, Osaka (JP)

(73) Assignee: Shimano Inc., Osaka (JP)

(*) Notice: Subject to any disclaimer, the term of this patent is extended or adjusted under 35 U.S.C. 154(b) by 1122 days.

(21) Appl. No.: 17/480,873

(22) Filed: Sep. 21, 2021

(65) Prior Publication Data

US 2022/0204127 A1 Jun. 30, 2022

(30) Foreign Application Priority Data

Dec. 28, 2020 (JP) .................. 2020-219512

(51) Int. Cl.
*B62M 6/50* (2010.01)
*B62J 45/414* (2020.01)
*B62J 45/415* (2020.01)

(52) U.S. Cl.
CPC .............. *B62M 6/50* (2013.01); *B62J 45/414* (2020.02); *B62J 45/4152* (2020.02)

(58) Field of Classification Search
CPC ...... B62M 6/50; B62J 45/414; B62J 45/4152; B62J 45/41; B62L 1/00
See application file for complete search history.

(56) References Cited

U.S. PATENT DOCUMENTS

| | | | |
|---|---|---|---|
| 11,161,565 B2* | 11/2021 | Kurotobi | B62K 25/30 |
| 2019/0308690 A1* | 10/2019 | Terashima | B62M 6/55 |
| 2020/0247498 A1* | 8/2020 | Yamamoto | B62J 45/412 |
| 2020/0406999 A1* | 12/2020 | Corbett | B62M 6/50 |
| 2020/0407012 A1* | 12/2020 | Kitano | B62M 6/45 |
| 2020/0407013 A1* | 12/2020 | Corbett | B62M 6/60 |
| 2020/0409381 A1* | 12/2020 | Corbett | B62M 6/50 |
| 2021/0107581 A1* | 4/2021 | Hara | B62J 1/08 |
| 2022/0063672 A1* | 3/2022 | Corbett | B60W 60/0016 |
| 2022/0066448 A1* | 3/2022 | Corbett | B62M 6/65 |

FOREIGN PATENT DOCUMENTS

| | | |
|---|---|---|
| JP | 8-310477 A | 11/1996 |
| JP | 2020-29206 A | 2/2020 |
| JP | 2020-138700 A | 9/2020 |

* cited by examiner

*Primary Examiner* — Richard M Camby
(74) *Attorney, Agent, or Firm* — Global IP Counselors, LLP

(57) ABSTRACT

A control device is provided for a human-powered vehicle. The control device includes an electronic controller that is configured to control a motor that assists in propulsion of the human-powered vehicle. The electronic controller is configured to control the motor in accordance with a pitch angle of the human-powered vehicle and information related to a user load applied by a user to the human-powered vehicle in a negative direction with respect to a propulsion direction of the human-powered vehicle.

10 Claims, 7 Drawing Sheets

HUMAN-POWERED VEHICLE CONTROL DEVICE AND HUMAN-POWERED VEHICLE CONTROL SYSTEM

CROSS-REFERENCE TO RELATED APPLICATIONS

This application claims priority to Japanese Patent Application No. 2020-219512, filed on Dec. 28, 2020. The entire disclosure of Japanese Patent Application No. 2020-219512 is hereby incorporated herein by reference.

BACKGROUND

Technical Field

The present disclosure generally relates to a human-powered vehicle control device and a human-powered vehicle control system.

Background Information

Japanese Laid-Open Patent Publication No. 2020-29206 (Patent Document 1) discloses an example of a control device for a human-powered vehicle. The human-powered vehicle control device of Patent Document 1 controls a motor using information related to a user load applied by a user to the human-powered vehicle with respect to a propulsion direction of the human-powered vehicle.

SUMMARY

An objective of the present disclosure is to provide a human-powered vehicle control device and a human-powered vehicle control system that optimally control a motor using information related to a user load applied by a user to the human-powered vehicle with respect to a propulsion direction of the human-powered vehicle.

A control device in accordance with a first aspect of the present disclosure is for a human-powered vehicle. The control device basically comprises an electronic controller that is configured to control a motor that assists in propulsion of the human-powered vehicle. The electronic controller is configured to control the motor in accordance with a pitch angle of the human-powered vehicle and information related to a user load applied by a user to the human-powered vehicle in a negative direction with respect to a propulsion direction of the human-powered vehicle. The control device according to the first aspect can control the motor in accordance with the pitch angle of the human-powered vehicle and the information related to the user load applied by a user to the human-powered vehicle in the negative direction with respect to the propulsion direction of the human-powered vehicle. Thus, the motor is controlled in a preferred manner using the information related to the user load applied by a user to the human-powered vehicle with respect to the propulsion direction of the human-powered vehicle.

A control device in accordance with a second aspect of the present disclosure is for a human-powered vehicle. The control device comprises an electronic controller configured to control a motor that assists in propulsion of the human-powered vehicle. The electronic controller is configured to control the motor in accordance with a pitch angle of the human-powered vehicle and information related to a user load in a pulling direction applied by a user to the human-powered vehicle. The control device according to the second aspect can control the motor in accordance with the pitch angle of the human-powered vehicle and the information related to the user load in the pulling direction applied by a user to the human-powered vehicle. Thus, the motor is controlled in a preferred manner using the information related to the user load applied by a user to the human-powered vehicle with respect to the propulsion direction of the human-powered vehicle.

In accordance with a third aspect of the present disclosure, the control device according to the first or second aspect is configured so that the electronic controller is configured to restrict drive of the motor in a case where the pitch angle of the human-powered vehicle is less than or equal to a first angle during a first time before a point of time at which the information related to the user load is detected. The control device according to the third aspect can restrict drive of the motor in a case where the pitch angle of the human-powered vehicle is less than or equal to the first angle during the first time before a point of time at which the information related to the user load is detected.

In accordance with a fourth aspect of the present disclosure, the control device according to the first or second aspect is configured so that the electronic controller is configured to decrease output of the motor in a case where the pitch angle of the human-powered vehicle is less than or equal to a first angle during a first time before a point of time at which the information related to the user load is detected. The control device according to the fourth aspect can decrease the output of the motor in a case where the pitch angle of the human-powered vehicle is less than or equal to the first angle during the first time before a point of time at which the information related to the user load is detected.

In accordance with a fifth aspect of the present disclosure, the control device according to any one of the first to fourth aspects is configured so that the electronic controller is configured to control the motor in accordance with the pitch angle of the human-powered vehicle and the information related to the user load in a case where the user is determined to be riding the human-powered vehicle. The control device according to the fifth aspect can optimally control the motor in accordance with the pitch angle of the human-powered vehicle and the information related to the user load in a case where the rider is determined to be riding the human-powered vehicle.

In accordance with a sixth aspect of the present disclosure, the control device according to any one of the first to fifth aspects is configured so that the electronic controller is configured to control the motor in accordance with the pitch angle of the human-powered vehicle and the information related to the user load applied by the user to at least one of a handlebar, a pedal, and a saddle of the human-powered vehicle. The control device according to the sixth aspect can control the motor in accordance with the pitch angle of the human-powered vehicle and the information related to the user load applied by the user to at least one of the handlebar, the pedal, and the saddle of the human-powered vehicle.

In accordance with a seventh aspect of the present disclosure, the control device according to the sixth aspect is configured so that the electronic controller is configured to drive the motor in a case where the pitch angle of the human-powered vehicle is greater than or equal to a second angle during a second time before a point of time at which the information related to the user load is detected. The control device according to the seventh aspect can drive the motor in a case where the pitch angle of the human-powered vehicle is greater than or equal to the second angle during the second time before a point of time at which the information related to the user load is detected.

In accordance with an eighth aspect of the present disclosure, the control device according to the sixth aspect is configured so that the electronic controller is configured to increase output of the motor in a case where the pitch angle of the human-powered vehicle is greater than or equal to a second angle during a second time before a point of time at which the information related to the user load is detected. The control device according to the eighth aspect can increase the output of the motor in a case where the pitch angle of the human-powered vehicle is greater than or equal to the second angle during the second time before a point of time at which the information related to the user load is detected.

In accordance with a ninth aspect of the present disclosure, the control device according to any one of the first to eighth aspects is configured so that the electronic controller is configured to control the motor in accordance with information related to a user load applied by the user to the human-powered vehicle in a positive direction with respect to the propulsion direction of the human-powered vehicle in a case where the user is determined to be riding the human-powered vehicle. The control device according to the ninth aspect can control the motor in accordance with the information related to the user load applied by the user, who is riding the human-powered vehicle, to the human-powered vehicle in the positive direction with respect to the propulsion direction of the human-powered vehicle.

A control device according to a tenth aspect of the present disclosure is for a human-powered vehicle. The control device comprises an electronic controller configured to control a motor that assists in propulsion of the human-powered vehicle. In a case where a user is riding the human-powered vehicle, the electronic controller is configured to control the motor in accordance with information related to a user load applied by the user to the human-powered vehicle in a positive direction with respect to a propulsion direction of the human-powered vehicle. The control device according to the tenth aspect can control the motor in accordance with the information related to the user load applied by a user, who is riding the human-powered vehicle, to the human-powered vehicle in the positive direction with respect to the propulsion direction of the human-powered vehicle.

A control device in accordance with an eleventh aspect of the present disclosure is for a human-powered vehicle. The control device comprises an electronic controller configured to control a motor that assists in propulsion of the human-powered vehicle. In a case where a user is riding the human-powered vehicle, the electronic controller is configured to control the motor in accordance with information related to a user load in a pushing direction applied by the user to the human-powered vehicle. The control device according to the eleventh aspect can control the motor in accordance with the information related to the user load in the pushing direction applied by a user, who is riding the human-powered vehicle, to the human-powered vehicle. Thus, the motor is controlled in a preferred manner using the information related to the user load applied by a user to the human-powered vehicle with respect to the propulsion direction of the human-powered vehicle.

In accordance with a twelfth aspect of the present disclosure, the control device according to the tenth or eleventh aspect is configured so that the electronic controller is configured to drive the motor in a case where a pitch angle of the human-powered vehicle is greater than or equal to a second angle during a second time before a point of time at which the information related to the user load is detected. The control device according to the twelfth aspect can drive the motor in a case where the pitch angle of the human-powered vehicle is greater than or equal to the second angle during the second time before a point of time at which the information related to the user load is detected.

In accordance with a thirteenth aspect of the present disclosure, the control device according to the tenth or eleventh aspect is configured so that the electronic controller is configured to increase output of the motor in a case where a pitch angle of the human-powered vehicle is greater than or equal to a second angle during a second time before a point of time at which the information related to the user load is detected. The control device according to the thirteenth aspect can increase the output of the motor in a case where the pitch angle of the human-powered vehicle is greater than or equal to the second angle during the second time before a point of time at which the information related to the user load is detected.

In accordance with a fourteenth aspect of the present disclosure, the control device according to any one of the ninth to thirteenth aspects is configured so that the electronic controller is configured to control the motor in accordance with the information related to the user load applied by the user to at least one of a handlebar, a pedal, and a saddle of the human-powered vehicle. The control device according to the fourteenth aspect can control the motor in accordance with the information related to the user load applied by the user to at least one of the handlebar, the pedal, and the saddle of the human-powered vehicle.

In accordance with a fifteenth aspect of the present disclosure, the control device according to the tenth or eleventh aspect is configured so that the electronic controller is configured to control a brake device of the human-powered vehicle. The control device according to the fifteenth aspect can control the brake device.

In accordance with a sixteenth aspect of the present disclosure, the control device according to any one of the first to fifteenth aspects is configured so that the electronic controller is configured to drive the motor in a state in which human driving force is input to the human-powered vehicle. The control device according to the sixteenth aspect can drive the motor in a state in which human driving force is input to the human-powered vehicle.

In accordance with a seventeenth aspect of the present disclosure, the control device according to any one of the first to sixteenth aspects is configured so that the electronic controller is configured to drive the motor in a state in which human driving force is not input to the human-powered vehicle. The control device according to the seventeenth aspect can drive the motor in a state in which human driving force is not input to the human-powered vehicle.

A control system in accordance with an eighteenth aspect of the present disclosure is for a human-powered vehicle. The control system comprises an electronic controller, a first sensor, and a second sensor. The electronic controller is configured to control a motor that assists in propulsion of the human-powered vehicle. The first sensor detects information related to a user load applied to the human-powered vehicle by a user of the human-powered vehicle. The second sensor detects a pitch angle of the human-powered vehicle. The electronic controller is configured to control the motor in accordance with information related to the user load in a negative direction with respect to a propulsion direction of the human-powered vehicle detected by the first sensor and the pitch angle of the human-powered vehicle detected by the second sensor. The control system according to the eighteenth aspect can control the motor in accordance with the information related to the user load in the negative direction with respect to the propulsion direction of the human-powered vehicle detected by the first sensor and the pitch angle of the human-powered vehicle detected by the second sensor. Thus, the motor is controlled in a preferred manner using the information related to the user load applied by a user to the human-powered vehicle with respect to the propulsion direction of the human-powered vehicle.

A control system in accordance with a nineteenth aspect of the present disclosure is for a human-powered vehicle. The control system comprises an electronic controller, a first sensor, and a second sensor. The electronic controller is configured to control a motor that assists in propulsion of the human-powered vehicle. The first sensor detects information related to a user load applied to the human-powered vehicle by a user of the human-powered vehicle. The second sensor detects a pitch angle of the human-powered vehicle. The electronic controller is configured to control the motor in accordance with information related to the user load in a pulling direction detected by the first sensor and the pitch angle of the human-powered vehicle detected by the second sensor. The control system according to the nineteenth aspect can control the motor in accordance with the information related to the user load in the pulling direction detected by the first sensor and the pitch angle of the human-powered vehicle detected by the second sensor. Thus, the motor is controlled in a preferred manner using the information related to the user load applied by a user to the human-powered vehicle with respect to the propulsion direction of the human-powered vehicle.

In accordance with a twentieth aspect of the present disclosure, the control system according to the eighteenth or nineteenth aspect is configured so that the electronic controller is configured to restrict drive of the motor in a case where the pitch angle of the human-powered vehicle is less than or equal to a first angle during a first time before a point of time at which the information related to the user load is detected. The control system according to the twentieth aspect can restrict drive of the motor in a case where the pitch angle of the human-powered vehicle is less than or equal to the first angle during the first time before a point of time at which the information related to the user load is detected.

In accordance with a twenty-first aspect of the present disclosure, the control system according to the eighteenth or nineteenth aspect is configured so that the electronic controller is configured to decrease output of the motor in a case where the pitch angle of the human-powered vehicle is less than or equal to a first angle during a first time before a point of time at which the information related to the user load is detected. The control system according to the twenty-first aspect can decrease the output of the motor in a case where the pitch angle of the human-powered vehicle is less than or equal to the first angle during the first time before a point of time at which the information related to the user load is detected.

In accordance with a twenty-second aspect of the present disclosure, the control system according to any one of the eighteenth to twenty-first aspects is configured so that the electronic controller is configured to control the motor in accordance with the pitch angle of the human-powered vehicle and the information related to the user load applied by the user to the human-powered vehicle in a positive direction with respect to the propulsion direction of the human-powered vehicle in a case where the user is determined to be riding the human-powered vehicle. The control system according to the twenty-second aspect can control the motor in accordance with the pitch angle of the human-powered vehicle and the information related to the user load applied by the user, who is riding the human-powered vehicle, to the human-powered vehicle in the positive direction with respect to the propulsion direction of the human-powered vehicle.

In accordance with a twenty-third aspect of the present disclosure, the control system according to any one of the eighteenth to twenty-second aspects is configured so that the second sensor includes at least one of an inclination sensor and an acceleration sensor. The control system according to the twenty-third aspect can detect the pitch angle of the human-powered vehicle with the second sensor including at least one of an inclination sensor and an acceleration sensor.

A control system in accordance with a twenty-fourth aspect of the present disclosure is for a human-powered vehicle. The control system comprises an electronic controller, a first sensor, and a third sensor. The electronic controller is configured to control a motor that assists in propulsion of the human-powered vehicle. The first sensor detects information related to a user load applied to the human-powered vehicle by a user of the human-powered vehicle. The third sensor detects whether the user is riding the human-powered vehicle. The electronic controller is configured to control the motor in accordance with information related to the user load in a positive direction with respect to a propulsion direction of the human-powered vehicle detected by the first sensor in a case where the third sensor detects that the user is riding the human-powered vehicle. The control system according to the twenty-fourth aspect can control the motor in accordance with the information related to the user load in the positive direction with respect to the propulsion direction of the human-powered vehicle detected by the first sensor in a case where the third sensor detects that a user is riding the human-powered vehicle. Thus, the motor is controlled in a preferred manner using the information related to the user load applied by a user to the human-powered vehicle with respect to the propulsion direction of the human-powered vehicle.

A control system in accordance with a twenty-fifth aspect of the present disclosure is for a human-powered vehicle. The control system comprises an electronic controller, a first sensor, and a third sensor. The electronic controller is configured to control a motor that assists in propulsion of the human-powered vehicle. The first sensor detects information related to a user load applied to the human-powered vehicle by a user of the human-powered vehicle. The third sensor detects whether the user is riding the human-powered vehicle. The electronic controller is configured to control the motor in accordance with information related to a user load in a pushing direction detected by the first sensor in a case where the third sensor detects that the user is riding the human-powered vehicle. The control system according to the twenty-fifth aspect can control the motor in accordance with the information related to the user load in the pushing direction detected by the first sensor in a case where the third sensor detects that a user is riding the human-powered vehicle. Thus, the motor is controlled in a preferred manner using the information related to the user load applied by a user to the human-powered vehicle with respect to the propulsion direction of the human-powered vehicle.

In accordance with a twenty-sixth aspect of the present disclosure, the control system according to the twenty-fourth or twenty-fifth aspect is configured so that the electronic controller is configured to drive the motor in a case where a pitch angle of the human-powered vehicle is greater than or equal to a second angle during a second time before a point of time at which the information related to the user load is detected. The control system according to the twenty-sixth aspect can drive the motor in a case where the pitch angle of the human-powered vehicle is greater than or equal to the second angle during the second time before a point of time at which the information related to the user load is detected.

In accordance with a twenty-seventh aspect of the present disclosure, the control system according to the twenty-fourth or twenty-fifth aspect is configured so that the electronic controller is configured to increase output of the motor in a case where a pitch angle of the human-powered vehicle is greater than or equal to a second angle during a second time before a point of time at which the information related to the user load is detected. The control system according to the twenty-seventh aspect can increase the output of the motor in a case where the pitch angle of the human-powered vehicle is greater than or equal to the second angle during the second time before a point of time at which the information related to the user load is detected. Thus, the motor is controlled in a preferred manner using the information related to the user load applied by a user to the human-powered vehicle with respect to the propulsion direction of the human-powered vehicle.

In accordance with a twenty-eighth aspect of the present disclosure, the control system according to any one of the twenty-fourth to twenty-seventh aspects is configured so that the third sensor includes a load sensor provided on at least one of a handlebar, a pedal, and a saddle of the human-powered vehicle. The control system according to the twenty-eighth aspect can detect whether a user is riding the human-powered vehicle with the third sensor that includes the load sensor provided on at least one of the handlebar, the pedal, and the saddle of the human-powered vehicle.

In accordance with a twenty-ninth aspect of the present disclosure, the control system according to any one of the eighteenth to twenty-eighth aspects is configured so that the first sensor includes at least one of an acceleration sensor and a load sensor. The control system according to the twenty-ninth aspect can detect the information related to the user load applied to the human-powered vehicle with the first sensor including at least one of an acceleration sensor and a load sensor.

In accordance with a thirtieth aspect of the present disclosure, the control system according to any one of the eighteenth to twenty-ninth aspects is configured so that the first sensor is provided on at least one of a handlebar, a pedal, and a saddle of the human-powered vehicle. The control system according to the thirtieth aspect includes the first sensor provided on at least one of the handlebar, the pedal, and the saddle of the human-powered vehicle. This allows for the user load applied to the human-powered vehicle to be detected in a preferred manner.

In accordance with a thirty-first aspect of the present disclosure, the control system according to the twenty-fourth or twenty-fifth aspect is configured so that the electronic controller is configured to control a brake device of the human-powered vehicle. The control system according to the thirty-first aspect can control the brake device.

The human-powered vehicle control device and the human-powered vehicle control system in accordance with the present disclosure can control the motor in a preferred manner using the information related to the user load applied by a user to the human-powered vehicle with respect to the propulsion direction of the human-powered vehicle.

BRIEF DESCRIPTION OF THE DRAWINGS

Referring now to the attached drawings which form a part of this original disclosure.

DETAILED DESCRIPTION OF EMBODIMENTS

Figure 1:
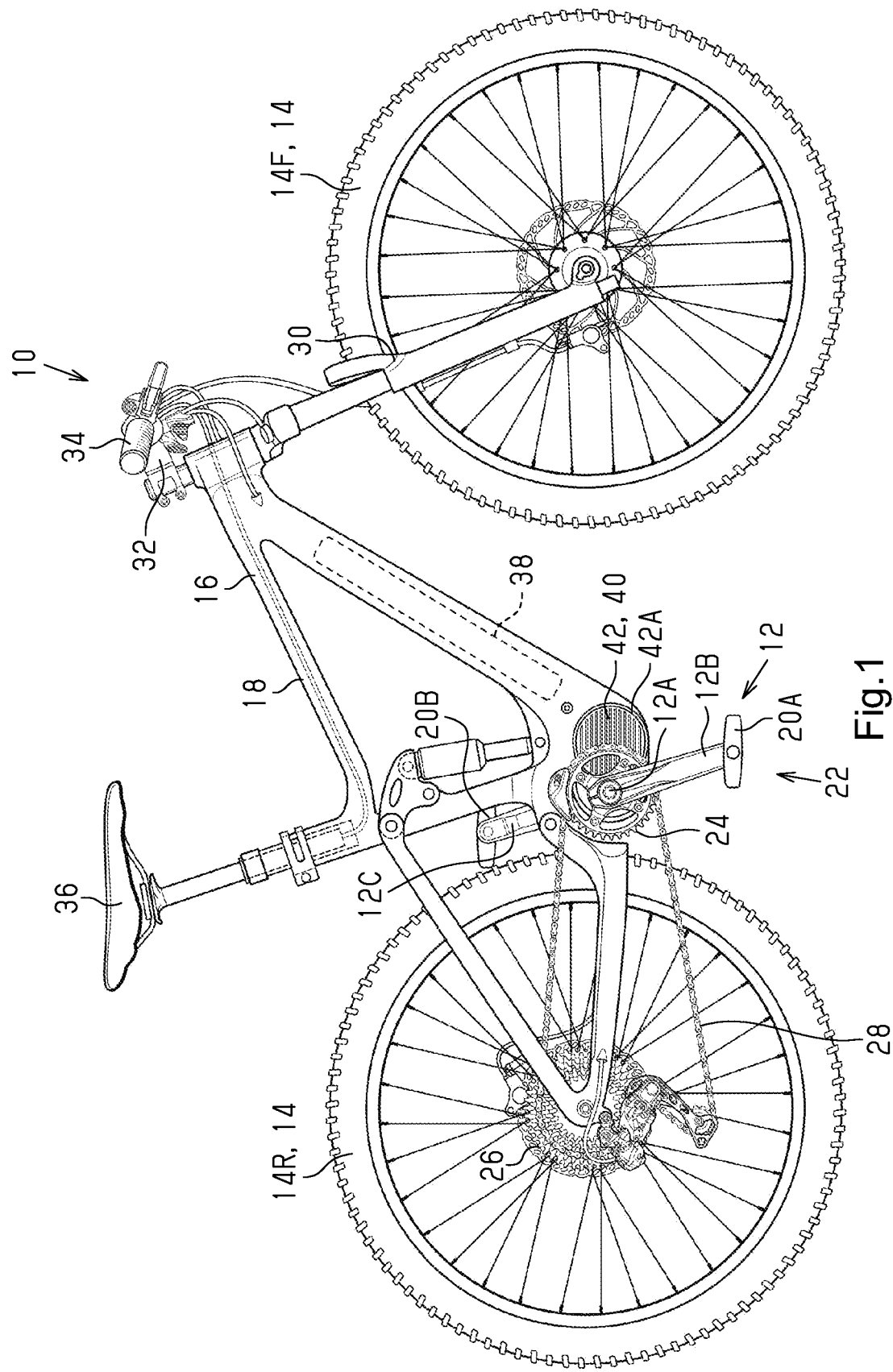
FIG. 1 is a side elevational view of a human-powered vehicle (e.g., a bicycle) including a human-powered vehicle control device and a human-powered vehicle control system in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle control device 60 in accordance with a first embodiment will now be described with reference to FIGS. 1 to 6. A human-powered vehicle 10 is a vehicle that includes at least one wheel and can be driven by at least human driving force H. Examples of the human-powered vehicle 10 include various types of bicycles such as a mountain bike, a road bike, a city bike, a cargo bike, a handcycle, and a recumbent bike. There is no limit to the number of wheels of the human-powered vehicle 10. The human-powered vehicle 10 also includes, for example, a unicycle or a vehicle having three or more wheels. The human-powered vehicle 10 includes an electric bicycle (E-bike) that uses drive force of an electric motor for propulsion in addition to the human driving force H. The E-bike includes an electric assist bicycle that assists in propulsion with an electric motor. In the embodiment described hereafter, the human-powered vehicle 10 will be described as an electric assist bicycle that is also a mountain bike.

The human-powered vehicle 10 includes a crank 12 to which the human driving force H is input. The human-powered vehicle 10 further includes at least one wheel 14 and a vehicle body 16. The at least one wheel 14 includes a rear wheel 14R and a front wheel 14F. The vehicle body 16 includes a frame 18. The crank 12 includes an input rotational shaft 12A, a first crank arm 12B, and a second crank arm 12C. The input rotational shaft 12A is rotatable relative to the frame 18. The first crank arm 12B is provided on a first axial end of the input rotational shaft 12A, and the second crank arm 12C is provided on a second axial end of the input rotational shaft 12A. In the present embodiment, the input rotational shaft 12A is a crank axle. A first pedal 20A is connected to the first crank arm 12B. A second pedal 20B is connected to the second crank arm 12C.

The human-powered vehicle 10 includes a drive mechanism 22. The drive mechanism 22 includes a first rotational body 24 connected to the input rotational shaft 12A. The input rotational shaft 12A and the first rotational body 24 can be coupled to rotate integrally with each other. Alternatively, the input rotational shaft 12A and the first rotational body 24 can be coupled by a first one-way clutch. The first one-way clutch is configured to rotate the first rotational body 24 forward in a case where the crank 12 is rotated forward and allow relative rotation of the crank 12 and the first rotational body 24 in a case where the crank 12 is rotated rearward. The first rotational body 24 includes a sprocket, a pulley, or a bevel gear. The drive mechanism 22 further includes a second rotational body 26 and a linking member 28. The linking member 28 transmits the rotational force of the first rotational body 24 to the second rotational body 26. The linking member 28 includes, for example, a chain, a belt, or a shaft.

The second rotational body 26 is connected to the rear wheel 14R. The second rotational body 26 includes a sprocket, a pulley, or a bevel gear. Preferably, a second one-way clutch is provided between the second rotational body 26 and the rear wheel 14R. The second one-way clutch is configured to rotate the rear wheel 14R forward in a case where the second rotational body 26 is rotated forward and allow relative rotation of the second rotational body 26 and the rear wheel 14R in a case where the second rotational body 26 is rotated rearward. The human-powered vehicle 10 can include a transmission. The transmission includes at least one of an external transmission device and an internal transmission device. An external transmission device includes, for example, a derailleur, the first rotational body 24, and the second rotational body 26. The derailleur includes at least one of a front derailleur and a rear derailleur. The first rotational body 24 can include sprockets. The second rotational body 26 can include sprockets. An internal transmission device can be provided, for example, on a hub of the rear wheel 14R or in a power transmission path extending from the input rotational shaft 12A to the first rotational body 24.

The front wheel 14F is attached to the frame 18 by a front fork 30. A handlebar 34 is connected to the front fork 30 by a stem 32. In the present embodiment, the rear wheel 14R is connected to the crank 12 by the drive mechanism 22. Alternatively, at least one of the rear wheel 14R and the front wheel 14F can be connected to the crank 12 by the drive mechanism 22. A saddle 36 is attached to the frame 18 by a seatpost.

The human-powered vehicle 10 further includes a battery 38. The battery 38 includes one or more battery cells. Each battery cell includes a rechargeable battery. The battery 38 is configured to supply the control device 60 with electric power. Preferably, the battery 38 is connected to an electronic controller 62 of the control device 60 via an electric cable or a wireless communication device in a manner allowing for communication. The battery 38 is configured to establish communication with the electronic controller 62 through, for example, power line communication (PLC), Controller Area Network (CAN), or Universal Asynchronous Receiver/Transmitter (UART).

The human-powered vehicle 10 includes a motor 40 configured to apply a propulsion force to the human-powered vehicle 10. The motor 40 includes one or more electric motors. The electric motor is, for example, a brushless motor. The motor 40 is configured to transmit rotational force to at least one of the front wheel 14F and a power transmission path of the human driving force H extending from the pedals 20A and 20B to the rear wheel 14R. Thus, the motor 40 constitutes an assist motor. The power transmission path of the human driving force H from the pedals 20A and 20B to the rear wheel 14R includes the rear wheel 14R. In the present embodiment, the motor 40 is provided on the frame 18 of the human-powered vehicle 10 and configured to transmit rotational force to the first rotational body 24.

The motor 40 is provided in a housing 42A. The housing 42A is provided on the frame 18. The housing 42A is, for example, attached to the frame 18 in a detachable manner. The motor 40 and the housing 42A in which the motor 40 is provided define a drive unit 42. The drive unit 42 can include a speed reducer connected to an output shaft of the motor 40. In the present embodiment, the housing 42A rotatably supports the input rotational shaft 12A. In the present embodiment, it is preferred that a third one-way clutch be provided in the power transmission path between the motor 40 and the input rotational shaft 12A. The third one-way clutch is configured to restrict transmission of the rotational force of the crank 12 to the motor 40 in a case where the input rotational shaft 12A is rotated in a direction in which the human-powered vehicle 10 moves forward. In a case where the motor 40 is provided on at least one of the rear wheel 14R and the front wheel 14F, the motor 40 can be provided on a hub and form a hub motor with the hub.

Figure 2:
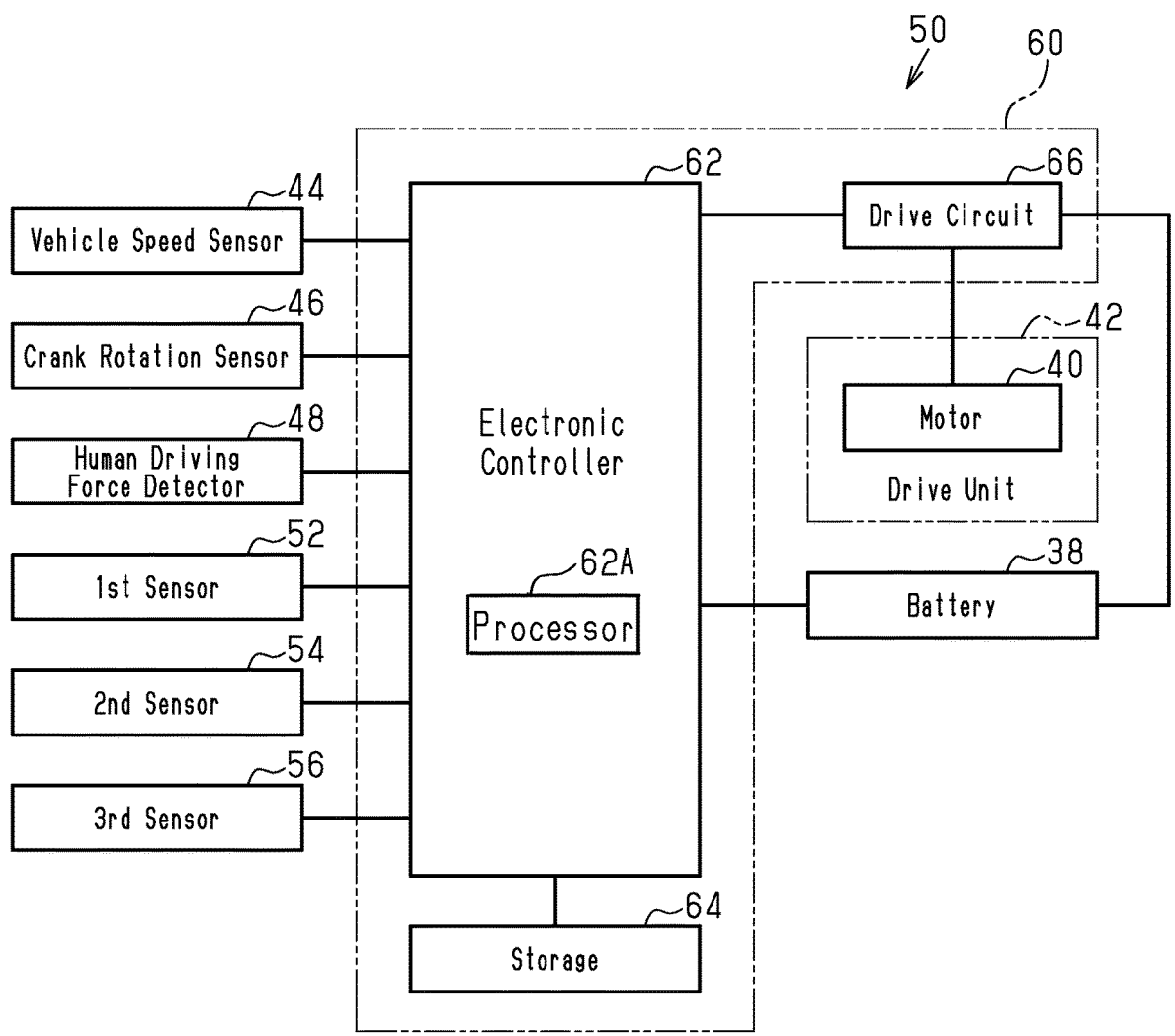
FIG. 2 is a block diagram showing the electrical structure of the human-powered vehicle including the human-powered vehicle control device and the human-powered vehicle control system in accordance with the first embodiment.

As shown in FIG. 2, a human-powered vehicle control system 50 includes the electronic controller 62 of the control device 60, a first sensor 52, and a second sensor 54.

The first sensor 52 detects information related to a user load applied by a user of the human-powered vehicle 10 to the human-powered vehicle 10. The second sensor 54 detects the pitch angle DA of the human-powered vehicle 10.

Preferably, the first sensor 52 includes at least one of an acceleration sensor and a load sensor. Preferably, the first sensor 52 is provided on at least one of the handlebar 34, the pedals 20A, 20B, and the saddle 36 of the human-powered vehicle 10.

Preferably, the first sensor 52 is configured to detect the user load applied by the user to the human-powered vehicle 10 in a negative direction with respect to a propulsion direction X1 of the human-powered vehicle 10. The first sensor 52 can be configured to detect a user load applied by the user to the human-powered vehicle 10 in a pulling direction X2. This type of user load can be referred to a user pulling load.

Figure 3:
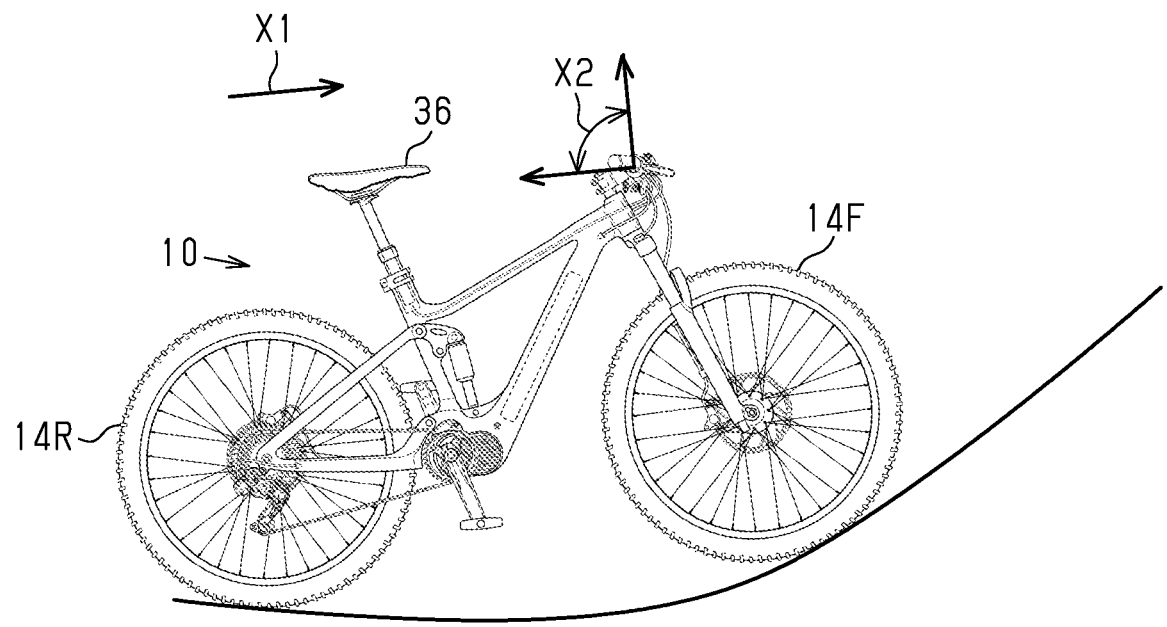
FIG. 3 is a schematic diagram of the human-powered vehicle (e.g., the bicycle) beginning to travel up an incline and illustrating a pulling direction.

As shown in FIG. 3, the propulsion direction X1 corresponds to a direction in which the human-powered vehicle 10 moves forward in a case where the pedals 20A and 20B are rotated in a first rotational direction. The pulling direction X2 includes the negative direction with respect to the propulsion direction X1. The pulling direction X2 includes, for example, a range from the negative direction with respect to the propulsion direction X1 to the upward direction of the human-powered vehicle 10. The upward direction of the human-powered vehicle 10 corresponds to, for example, the vertical direction in a case where the front wheel 14F and the rear wheel 14R are in contact with level ground. For example, the pulling direction X2 corresponds to a direction in which force acts in a case where the user riding the human-powered vehicle 10 pulls the handlebar 34 toward his or herself or in the negative direction with respect to the propulsion direction X1 of the human-powered vehicle 10. The user riding the human-powered vehicle 10 pulls the handlebar 34 toward his or herself in the negative direction with respect to the propulsion direction X1 of the human-powered vehicle 10 so as to apply a propulsion force for uphill riding to the human-powered vehicle 10 in a situation in which, for example, the human-powered vehicle is moving from level ground onto an uphill road (including bump or the like) or moving from a downhill road onto an uphill road. For example, the user riding the human-powered vehicle 10 moves his or her body weight on the saddle 36 in the negative direction with respect to the propulsion direction X1 to generate a pulling force that acts toward the user or in the negative direction with respect to the propulsion direction X1 of the human-powered vehicle 10 so as to apply a propulsion force for uphill riding to the human-powered vehicle 10. The user riding the human-powered vehicle 10 generates a pulling force that acts toward the user or in the negative direction with respect to the propulsion direction X1 of the human-powered vehicle 10 with, for example, the pedals 20A and 20B to apply a propulsion force for uphill riding to the human-powered vehicle 10.

Preferably, the first sensor 52 is also configured to detect the user load applied by the user to the human-powered vehicle 10 in a positive direction with respect to the propulsion direction X1 of the human-powered vehicle 10. The first sensor 52 can be configured to detect the user load applied by the user to the human-powered vehicle 10 in a pushing direction X3. This type of user load can be referred to a user pulling load.

Figure 4:
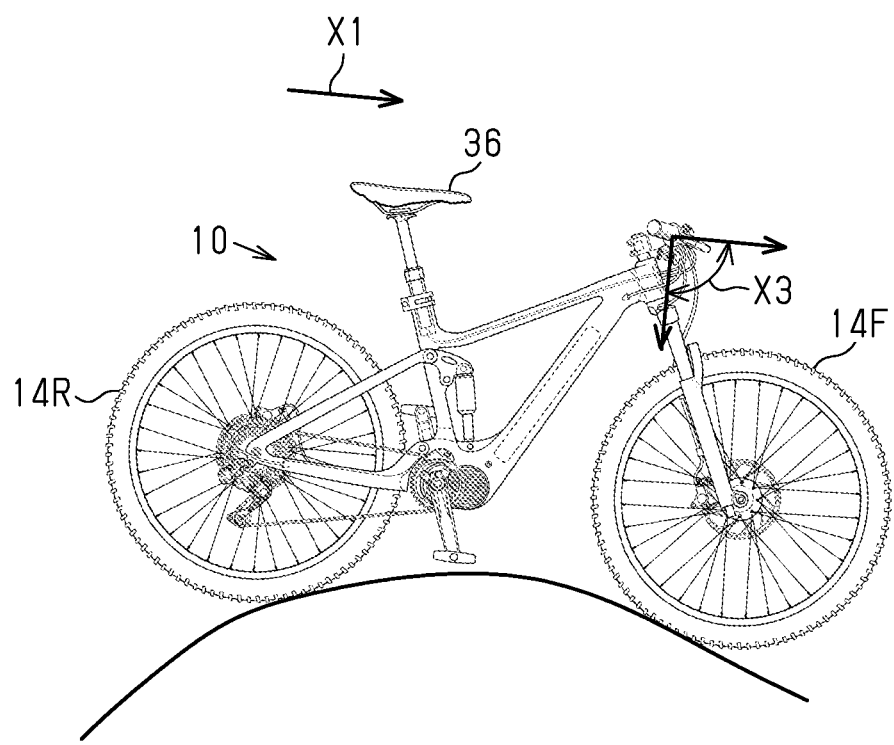
FIG. 4 is a schematic diagram of the human-powered vehicle (e.g., the bicycle) beginning to travel down a decline and illustrating a pushing direction.

As shown in FIG. 4, the pushing direction X3 includes the positive direction with respect to the propulsion direction X1. The pushing direction X2 includes, for example, a range from the positive direction with respect to the propulsion direction X1 to the downward direction of the human-powered vehicle 10. For example, the pushing direction X3 corresponds to a direction in which force acts in a case where the user riding the human-powered vehicle 10 pushes the handlebar 34 toward the front of the user or in the positive direction with respect to the propulsion direction X1 of the human-powered vehicle 10. The user riding the human-powered vehicle 10 pushes the handlebar 34 toward the front of the user or in the positive direction with respect to the propulsion direction X1 of the human-powered vehicle 10 to apply a propulsion force to the human-powered vehicle 10 in the positive direction with respect to the propulsion direction X1 in a situation in which, for example, the human-powered vehicle is moving from level ground onto a downhill road (including ditch or the like) or moving from an uphill road onto a downhill road. For example, the user riding the human-powered vehicle 10 moves his or her body weight on the saddle 36 in the positive direction with respect to the propulsion direction X1 to generate a pushing force that acts toward the front of the user or in the positive direction with respect to the propulsion direction X1 of the human-powered vehicle 10. The user riding the human-powered vehicle 10 generates a pushing force that acts toward the front of the user or in the positive direction with respect to the propulsion direction X1 of the human-powered vehicle 10 with, for example, the pedals 20A and 20B.

In a case where the first sensor 52 includes an acceleration sensor, it is preferred that the first sensor 52 detect acceleration with respect to the propulsion direction X1 of the human-powered vehicle 10. In a case where the first sensor 52 includes a load sensor, it is preferred that the first sensor 52 detect the user load applied by the user to at least one of the handlebar 34, the pedals 20A, 20B, and the saddle 36. The load sensor can include a strain sensor or a pressure sensor. The electronic controller 62 detects the user load applied to at least one of the handlebar 34, the pedals 20A, 20B, and the saddle 36 in the negative direction with respect to the propulsion direction X1 of the human-powered vehicle 10. In a case where the first sensor 52 includes an acceleration sensor, it is preferred that the first sensor 52 detect acceleration in the pulling direction X2 and the pushing direction X3. In a case where the first sensor 52 includes a load sensor, it is preferred that the first sensor 52 detects the user load in the pulling direction X2 and the pushing direction X3.

The second sensor 54 includes at least one of an inclination sensor and an acceleration sensor. An inclination sensor includes, for example, a gyro sensor. The second sensor 54 can include a global positioning system (GPS) receiver. In a case where the second sensor 54 includes a GPS receiver, storage 64 of the control device 60 stores map information including information related to road gradient in advance and the electronic controller 62 obtains the road gradient of the present location of the human-powered vehicle 10 as the pitch angle DA.

Preferably, the control system 50 includes a third sensor 56 that detects whether a user is riding the human-powered vehicle 10. The third sensor 56 includes a load sensor provided on at least one of the handlebar 34, the pedals 20A, 20B, and the saddle 36 of the human-powered vehicle 10. The third sensor 56 can be formed integrally with a load sensor of the first sensor 52.

The control device 60 includes the electronic controller 62. The electronic controller 62 can include one or more microcomputers. The electronic controller 62 includes at least one processor 62A that executes predetermined control programs. The at least one processor 62A of the electronic controller 62 include, for example, a central processing unit (CPU) or a micro-processing unit (MPU). When several processors are used, the processors of the electronic controller 62 can be provided at separate positions. For example, some of the processors can be provided on the human-powered vehicle 10, and the other processors can be provided in a server connected to the interne. In a case where the processors are provided at separate positions, the processors are connected to one another via a wireless communication device in a manner allowing for communication.

Preferably, the control device 60 further includes the storage 64. The storage 64 stores control programs and information used for control processes. The storage 64 includes any computer storage device or any non-transitory computer-readable medium with the sole exception of a transitory, propagating signal. For example, the storage 84 includes a nonvolatile memory and a volatile memory. The non-volatile memory includes, for example, at least one of a read-only memory (ROM), an erasable programmable read-only memory (EPROM), an electrically erasable programmable read-only memory (EEPROM), and a flash memory. The volatile memory includes, for example, a random-access memory (RAM).

Preferably, the control device 60 further includes a drive circuit 66 of the motor 40. Preferably, the drive circuit 66 and the electronic controller 62 are provided in the housing 42A of the drive unit 42. For example, the drive circuit 66 and the electronic controller 62 can be provided on the same circuit board. The drive circuit 66 includes an inverter circuit. The drive circuit 66 controls the electric power supplied from the battery 38 to the motor 40. The drive circuit 66 is connected to the electronic controller 62 via a conductive wire, an electric cable or a wireless communication device, and the like. The drive circuit 66 drives the motor 40 in response to control signals from the electronic controller 62.

The electronic controller 62 controls the motor 40 that assists in propulsion of the human-powered vehicle 10. Preferably, the electronic controller 62 is configured to control the motor 40 in accordance with the human driving force H input to the human-powered vehicle 10. Preferably, the electronic controller 62 drives the motor 40 in a state in which the human driving force H is input to the human-powered vehicle 10. The human driving force H can be expressed in torque or power.

Preferably, the human-powered vehicle 10 further includes at least one of a vehicle speed sensor 44, a crank rotation sensor 46, and a human driving force detector 48. The terms "sensor" and as "detector" used herein refers to a hardware device or instrument designed to detect the presence or absence of a particular event, object, substance, or a change in its environment, and to emit a signal in response. The terms "sensor" and as "detector" as used herein does not include a human.

The vehicle speed sensor 44 is configured to detect information related to the vehicle speed V of the human-powered vehicle 10. In the present embodiment, the vehicle speed sensor 44 is configured to detect information related to the rotational speed W of the at least one wheel 14 of the human-powered vehicle 10. For example, the vehicle speed sensor 44 is configured to detect a magnet provided on the at least one wheel 14 of the human-powered vehicle 10. For example, the vehicle speed sensor 44 is configured to output a predetermined number of detection signals during a period in which one of the at least one wheel 14 completes one rotation. The predetermined number is, for example, one. The vehicle speed sensor 44 outputs a signal corresponding to the rotational speed W of the wheel 14. The electronic controller 62 can calculate the vehicle speed V of the human-powered vehicle 10 based on the signal corresponding to the rotational speed W of the wheel 14 and information related to the circumferential length of the wheel 14. The storage 64 stores the information related to the circumferential length of the wheel 14.

The vehicle speed sensor 44 includes, for example, a magnetic sensor such as a magnetic reed that forms a reed switch or a Hall element. The vehicle speed sensor 44 can be mounted on a chainstay of the frame 18 of the human-powered vehicle 10 and configured to detect a magnet mounted on the rear wheel 14R. Alternatively, the vehicle speed sensor 44 can be mounted on the front fork 30 and configured to detect a magnet mounted on the front wheel 14F. In the present embodiment, the vehicle speed sensor 44 is configured so that a reed switch detects a magnet whenever the wheel 14 rotates once. The vehicle speed sensor 44 can have any configuration as long as information related to the vehicle speed V of the human-powered vehicle 10 is obtained. For example, the vehicle speed sensor 44 does not have to be configured to detect the magnet provided on the wheel 14 and can be configured to detect a slit provided in a disc brake. Alternatively, the vehicle speed sensor 44 can include a global positioning system (GPS) receiver or an optical sensor and the like. In a case where the vehicle speed sensor 44 includes a GPS receiver, the electronic controller 62 can calculate the vehicle speed V from the time and the distance moved. The vehicle speed sensor 44 is connected to the electronic controller 62 via a wireless communication device or an electric cable.

The crank rotation sensor 46 is configured to detect information related to the rotational speed C of the input rotational shaft 12A. The crank rotation sensor 46 is provided on, for example, the frame 18 or the drive unit 42 of the human-powered vehicle 10. The crank rotation sensor 46 can be provided on the housing 42A of the drive unit 42. The crank rotation sensor 46 includes a magnetic sensor that outputs a signal corresponding to the strength of the magnetic field. A ring-shaped magnet of which the magnetic field changes in a circumferential direction is provided on the input rotational shaft 12A, a member that is rotated in cooperation with the input rotational shaft 12A, or in the power transmission path from the input rotational shaft 12A to the first rotational body 24. The member rotated in cooperation with the input rotational shaft 12A can include the output shaft of the motor 40.

The crank rotation sensor 46 outputs a signal corresponding to the rotational speed C of the input rotational shaft 12A. For example, in a case where the first one-way clutch is not provided between the input rotational shaft 12A and the first rotational body 24, the magnet can be provided on the first rotational body 24. The crank rotation sensor 46 can have any configuration as long as information related to the rotational speed C of the input rotational shaft 12A is obtained. Instead of the magnetic sensor, the crank rotation sensor 46 can include an optical sensor, an acceleration sensor, a gyro sensor, a torque sensor, or the like. The crank rotation sensor 46 is connected to the electronic controller 62 via a wireless communication device or an electric cable.

The human driving force detector 48 is configured to detect information related to the human driving force H. The human driving force detector 48 is provided on, for example, the frame 18, the drive unit 42, the crank 12, or the pedals 20A, 20B of the human-powered vehicle 10. The human driving force detector 48 can be provided on the housing 42A of the drive unit 42. The human driving force detector 48 includes, for example, a torque sensor. The torque sensor is configured to output a signal corresponding to torque applied to the crank 12 by the human driving force H. For example, in a case where the first one-way clutch is provided in the power transmission path, it is preferred that the torque sensor be provided at an upstream side of the first one-way clutch in the power transmission path. The torque sensor includes a strain sensor, a magnetostrictive sensor, a pressure sensor, and the like. A strain sensor includes a strain gauge.

The torque sensor is provided in the power transmission path or near a member included in the power transmission path. The member included in the power transmission path is, for example, the input rotational shaft 12A, the crank arm 12B, 12C, the pedals 20A, 20B, or a member that transmits the human driving force H between the input rotational shaft 12A and the first rotational body 24. The human driving force detector 48 is connected to the electronic controller 62 via a wireless communication device or an electric cable. The human driving force detector 48 can have any configuration as long as information related to the human driving force H is obtained. For example, the human driving force detector 48 can include a sensor that detects the pressure applied to the pedals 20A, 20B, a sensor that detects the tension on the chain, and the like.

The electronic controller 62 is, for example, configured to control the motor 40 so that the assist level A of the motor 40 becomes a predetermined assist level A. The assist level A includes at least one of a ratio of output of the motor 40 to the human driving force H input to the human-powered vehicle 10, the maximum value of the output of the motor 40, and a restriction level R that restricts changes in the output of the motor 40 in a case where the output of the motor 40 decreases. The ratio of the assist force produced by the motor 40 to the human driving force H is also referred to as the assist ratio. The assist ratio can be the torque ratio of assist torque to human torque of the human-powered vehicle 10 or a ratio of power based on the assist force produced by the motor 40 to power based on the human force.

The electronic controller 62 is, for example, configured to control the motor 40 so that the assist force produced by the motor 40 relative to the human driving force H becomes a predetermined ratio. The human driving force H corresponds to the propulsion force of the human-powered vehicle 10 produced by a user rotating the crank 12. The assist force corresponds to the propulsion force of the human-powered vehicle 10 produced by the rotation of the motor 40. The predetermined ratio does not have to be a constant value. For example, the predetermined ratio can be changed in accordance with the human driving force H, the rotational speed C of the input rotational shaft 12A, or the vehicle speed V. Alternatively, the predetermined ratio can be changed in accordance with two of or every one of the human driving force H, the rotational speed C of the input rotational shaft 12A, and the vehicle speed V.

In the drive unit 42 of the present embodiment, the crank 12 is connected to the first rotational body 24 without a transmission, and the output of the motor 40 is input to the first rotational body 24. In a case where the crank 12 is connected to the first rotational body 24 without a transmission and the output of the motor 40 is input to the first rotational body 24, the human driving force H corresponds to the driving force input to the first rotational body 24 by the user rotating the crank 12. In a case where the crank 12 is connected to the first rotational body 24 without a transmission and the output of the motor 40 is input to the first rotational body 24, the assist force corresponds to the driving force input to the first rotational body 24 by the rotation of the motor 40. In a case where the output of the motor 40 is input to the first rotational body 24 via a speed reducer, the assist force corresponds to the output of the speed reducer.

If the motor 40 is provided on the front wheel 14F, the human driving force H corresponds to the output of the rear wheel 14R in a case where the rear wheel 14R is driven only by the user. If the motor 40 is provided on the front wheel 14F, the assist force corresponds to the output of the front wheel 14F in a case where the front wheel 14F is driven only by the motor 40. If the motor 40 is provided on the rear wheel 14R, the human driving force H corresponds to the output of the rear wheel 14R in a case where the rear wheel 14R is driven only by the user. Further, if the motor is provided on the rear wheel 14R, the assist force corresponds to the output of the rear wheel 14R in a case where the rear wheel 14R is driven only by the motor 40.

The electronic controller 62 is configured to control the motor 40 so that the assist force is less than or equal to the upper limit value MX. In a case where the output of the motor 40 is input to the first rotational body 24 and the assist force is expressed in torque, the electronic controller 62 is configured to control the motor 40 so that the assist torque becomes less than or equal to the upper limit value MTX. Preferably, the upper limit value MTX is a value in a range of 20 Nm or greater and 200 Nm or less. The upper limit value MTX is determined by, for example, the output characteristics of the motor 40. In a case where the output of the motor 40 is input to the first rotational body 24 and the assist force is expressed in power, the electronic controller 62 is configured to control the motor 40 so that the power based on the assist force becomes less than or equal to the upper limit value MWX.

Preferably, the electronic controller 62 is configured to change the restriction level R for changes in the output of the motor 40. As the restriction level R for changes in the output of the motor 40 is increased, a change amount in the output of the motor 40 per unit time relative to a change amount in a control parameter of the motor 40 per unit time decreases. As the restriction level R for changes in the output of the motor 40 is decreased, a change amount in the output of the motor 40 per unit time relative to a change amount in the control parameter of the motor 40 per unit time increases. The control parameter of the motor 40 is the human driving force H or the rotational speed C of the input rotational shaft 12A. The restriction level R for changes in the output of the motor 40 is inversely proportional to a response speed of the motor 40. The response speed of the motor 40 is expressed by a change amount in the output of the motor 40 per unit time relative to a change amount in the control parameter of the motor 40 per unit time. As the restriction level R for changes in the output of the motor 40 increases, the response speed of the motor 40 decreases.

The electronic controller 62 changes the restriction level R with, for example, a filter. The filter includes, for example, a low pass filter having a time constant. The electronic controller 62 changes the restriction level R by changing the time constant of the filter. The electronic controller 62 can change the restriction level R by changing the gain for calculating the output of the motor 40 from the human driving force H. For example, a processor executes predetermined software to implement the filter.

The electronic controller 62 controls the motor 40 in accordance with the pitch angle DA of the human-powered vehicle 10 and information related to a user load applied by a user to the human-powered vehicle 10 in the negative direction with respect to the propulsion direction X1 of the human-powered vehicle 10. Preferably, the electronic controller 62 controls the motor 40 in accordance with the pitch angle DA of the human-powered vehicle 10 and the information related to the user load applied by a user to at least one of the handlebar 34, the pedals 20A and 20B, and the saddle 36 of the human-powered vehicle 10. Preferably, the electronic controller 62 controls the motor 40 in accordance with the information related to the user load in the negative direction with respect to the propulsion direction X1 of the human-powered vehicle 10 detected by the first sensor 52 and the pitch angle DA of the human-powered vehicle 10 detected by the second sensor 54.

The electronic controller 62 can control the motor 40 in accordance with the pitch angle DA of the human-powered vehicle 10 and the information related to the user load in the pulling direction X2 applied by a user to the human-powered vehicle 10.

Preferably, the electronic controller 62 controls the motor 40 in accordance with the pitch angle DA in a case where the user load applied by a user to the human-powered vehicle 10 in the negative direction with respect to the propulsion direction X1 of the human-powered vehicle 10 is greater than or equal to a first load. The first load is set to have a value corresponding to a case where the user applies a load to the human-powered vehicle 10 to decrease the vehicle speed V of the human-powered vehicle 10.

Preferably, the electronic controller 62 restricts drive of the motor 40 in a case where the pitch angle DA of the human-powered vehicle 10 is less than or equal to a first angle DA1 during a first time T1 before a point of time at which the information related to the user load is detected. For example, the electronic controller 62 decreases output of the motor 40 in a case where the pitch angle DA of the human-powered vehicle 10 is less than or equal to the first angle DA1 during the first time T1 before a point of time at which the information related to the user load is detected. The first time T1 is a time period occurring before a point of time at which the information related to the user load is detected. The electronic controller 62 can decrease the assist level A in a case where the pitch angle DA of the human-powered vehicle 10 is less than or equal to the first angle DA1 during the first time T1 before a point of time at which the information related to the user load is detected. The electronic controller 62 can stop the motor 40 in a case where the pitch angle DA of the human-powered vehicle 10 is less than or equal to the first angle DA1 during the first time T1 before a point of time at which the information related to the user load is detected. The pitch angle DA and the first angle DA1 can be absolute angles. Alternatively, the pitch angle DA and the first angle DA1 can each be expressed by a change amount in the pitch angle DA per predetermined time. For example, in a case where the pitch angle DA and the first angle DA1 are absolute angles, the road is an uphill road if the pitch angle DA is a positive value, level ground if the pitch angle DA is zero, and a downhill road if the pitch angle DA is a negative value.

The first time T1 and the first angle DA1 are set, for example, by simulating a situation in which the human-powered vehicle 10 moves from level ground or a downhill road onto an uphill road at a first vehicle speed V1. In a case where the pitch angle DA and the first angle DA1 are each expressed by an absolute angle, it is preferred that the first angle DA1 be a positive value. In a case where the pitch angle DA and the first angle DA1 are each expressed by a change amount in the pitch angle DA per predetermined time, it is preferred that the first angle DA1 be a positive value.

Preferably, in a case where a user is riding the human-powered vehicle 10, the electronic controller 62 controls the motor 40 in accordance with the information related to the user load and the pitch angle DA of the human-powered vehicle 10. For example, in a case where it is determined from the output of the third sensor 56 that a user is riding the human-powered vehicle 10, the electronic controller 62 controls the motor 40 in accordance with the information related to the user load and the pitch angle DA of the human-powered vehicle 10. A case where a user is riding the human-powered vehicle 10 includes, for example, a case where the user is seated and pedaling the human-powered vehicle 10 and a case where the user is standing and pedaling the human-powered vehicle 10. Preferably, a case where a user is riding the human-powered vehicle 10 does not include a case where the user is walking the human-powered vehicle 10.

A process executed by the electronic controller 62 to control the motor 40 with respect to the user load in the negative direction will now be described with reference to FIG. 5. This process can also be used with respect to the user load in the pulling direction. For example, in a case where electric power is supplied to the electronic controller 62, the electronic controller 62 starts the process of the flowchart shown in FIG. 5 from step S11. In a case where the process of the flowchart shown in FIG. 5 ends, the electronic controller 62 repeats the process from step S11 in predetermined cycles, for example, until the supply of electric power stops.

In step S11, the electronic controller 62 determines whether a user is riding the human-powered vehicle 10. In a case where a user is not riding the human-powered vehicle 10, the electronic controller 62 ends processing. In a case where a user is riding the human-powered vehicle 10, the electronic controller 62 proceeds to step S12.

In step S12, the electronic controller 62 determines whether the user load applied by the user to the human-powered vehicle 10 in the negative direction with respect to the propulsion direction X1 is greater than or equal to the first load. In a case where the user load applied by the user to the human-powered vehicle 10 in the negative direction with respect to the propulsion direction X1 is not greater than or equal to the first load, the electronic controller 62 ends processing. In a case where the user load applied by the user to the human-powered vehicle 10 in the negative direction with respect to the propulsion direction X1 is greater than or equal to the first load, the electronic controller 62 proceeds to step S13.

In step S13, the electronic controller 62 determines whether the pitch angle DA of the human-powered vehicle 10 was less than or equal to the first angle DA1 during the first time T1 before a point of time at which the information related to the user load was detected. For example, the electronic controller 62 determines whether the pitch angle DA of the human-powered vehicle 10 was less than or equal to the first angle DA1 during the first time T1 before a point of time at which an affirmative determination was given in step S12. In a case where the pitch angle DA of the human-powered vehicle 10 was not less than or equal to first angle DA1 during first time T1 before a point of time at which the information related to the user load was detected, the electronic controller 62 ends processing. In a case where the pitch angle DA of the human-powered vehicle 10 was less than or equal to first angle DA1 during first time T1 before a point of time at which the information related to the user load was detected, the electronic controller 62 proceeds to step S14.

In step S14, the electronic controller 62 restricts drive of the motor 40 and then ends processing. For example, the electronic controller 62 decreases the assist level A in step S14. For example, the electronic controller 62 stops the motor 40 in step S14. As described above, in the present embodiment, a situation is simulated in which, for example, the human-powered vehicle 10 is moving from level ground or a downhill road onto an uphill road at the first vehicle speed V1. In such a situation, in a case where load is applied to the human-powered vehicle 10 in the negative direction with respect to the propulsion direction X1 or the pulling direction X2, if the motor 40 is driven without any restriction, the balance of the human-powered vehicle 10 will be adversely affected. Thus, the motor 40 in the present embodiment is effectively controlled.

The electronic controller 62 can cancel the restriction on drive of the motor 40 in a case where a cancellation condition is satisfied after step S14. The cancellation condition is satisfied, for example, in a case where a predetermined time elapses after drive of the motor 40 is restricted or a case where the pitch angle DA becomes greater than the first angle DA1.

In a case where a user is riding the human-powered vehicle 10, the electronic controller 62 controls the motor 40 in accordance with the information related to the user load applied by the user to the human-powered vehicle 10 in the positive direction with respect to the propulsion direction X1 of the human-powered vehicle 10. In a case where a user is riding the human-powered vehicle 10, the electronic controller 62 can control the motor 40 in accordance with information related to the user load in the pushing direction X3 applied by the user to the human-powered vehicle 10.

Preferably, the electronic controller 62 controls the motor 40 in accordance with information related to the user load applied by a user to at least one of the handlebar 34, the pedals 20A, 20B, and the saddle 36 of the human-powered vehicle 10. Preferably, the electronic controller 62 controls the motor 40 in accordance with information related to the user load applied by a user to at least one of the handlebar 34, the pedals 20A, 20B, and the saddle 36 of the human-powered vehicle 10 in the positive direction with respect to the propulsion direction X1 of the human-powered vehicle 10.

Preferably, in a case where a user is riding the human-powered vehicle 10, the electronic controller 62 controls the motor 40 in accordance with the pitch angle DA of the human-powered vehicle 10 and the information related to the user load applied by the user to the human-powered vehicle 10 in the positive direction with respect to the propulsion direction X1 of the human-powered vehicle 10.

Preferably, the electronic controller 62 controls the motor 40 in accordance with the pitch angle DA in a case where the user load applied by a user to the human-powered vehicle 10 in the positive direction with respect to the propulsion direction X1 of the human-powered vehicle 10 is greater than or equal to a second load.

In a case where the pitch angle DA of the human-powered vehicle 10 is greater than or equal to a second angle DA2 during a second time T2 before a point of time at which the information related to the user load is detected, the electronic controller 62 drives the motor 40. For example, the electronic controller 62 increases the output of the motor 40 in a case where the pitch angle DA of the human-powered vehicle 10 is greater than or equal to the second angle DA2 during the second time T2 before a point of time at which the information related to the user load is detected. The second time T2 is a time period occurring before a point of time at which the information related to the user load is detected. The electronic controller 62 can increase the assist level A in a case where the pitch angle DA of the human-powered vehicle 10 is greater than or equal to the second angle DA2 during the second time T2 before a point of time at which the information related to the user load is detected. The electronic controller 62 can drive the motor 40 in a case where the pitch angle DA of the human-powered vehicle 10 is less than or equal to the second angle DA2 during the second time T2 before a point of time at which the information related to the user load is detected in a state in which the motor 40 is stopped.

The second time T2 and the second angle DA2 are set by simulating a situation in which, for example, the human-powered vehicle 10 moves from level ground or an uphill road onto a downhill road at a second vehicle speed V2. The pitch angle DA and the second angle DA2 can be absolute angles. Alternatively, the pitch angle DA and the first angle DA1 can each be expressed by a change amount in the pitch angle DA per predetermined time.

In a case where the pitch angle DA and the second angle DA2 are expressed by absolute angles, it is preferred that the second angle DA2 be a negative value. In a case where the pitch angle DA and the second angle DA2 are each expressed by a change amount in the pitch angle DA per predetermined time, it is preferred that the second angle DA2 be a negative value.

A process executed by the electronic controller 62 to control the motor 40 with respect to the user load in the positive direction will now be described with reference to FIG. 6. This process can also be used with respect to the user load in the pushing direction. For example, in a case where electric power is supplied to the electronic controller 62, the electronic controller 62 starts the process of the flowchart shown in FIG. 6 from step S21. In a case where the process of the flowchart shown in FIG. 6 ends, the electronic controller 62 repeats the process from step S21 in predetermined cycles, for example, until the supply of electric power stops.

In step S21, the electronic controller 62 determines whether a user is riding the human-powered vehicle 10. In a case where a user is not riding the human-powered vehicle 10, the electronic controller 62 ends processing. In a case where a user is riding the human-powered vehicle 10, the electronic controller 62 proceeds to step S22.

In step S22, the electronic controller 62 determines whether the user load applied by the user to the human-powered vehicle 10 in the positive direction with respect to the propulsion direction X1 is greater than or equal to the second load. In a case where the user load applied by the user to the human-powered vehicle 10 in the positive direction with respect to the propulsion direction X1 is not greater than or equal to the second load, the electronic controller 62 ends processing. In a case where the user load applied by the user to the human-powered vehicle 10 in the positive direction with respect to the propulsion direction X1 is greater than or equal to the second load, the electronic controller 62 proceeds to step S23.

In step S23, the electronic controller 62 determines whether the pitch angle DA of the human-powered vehicle 10 was greater than or equal to the second angle DA2 during the second time T2 before a point of time at which the information related to the user load was detected. For example, the electronic controller 62 determines whether the pitch angle DA of the human-powered vehicle 10 was greater than or equal to the second angle DA2 during the second time T2 before a point of time at which an affirmative determination was given in step S22. In a case where the pitch angle DA of the human-powered vehicle 10 was not greater than or equal to the second angle DA2 during the second time T2 before a point of time at which the information related to the user load was detected, the electronic controller 62 ends processing. In a case where the pitch angle DA of the human-powered vehicle 10 was greater than or equal to the second angle DA2 during the second time T2 before a point of time at which the information related to the user load was detected, the electronic controller 62 proceeds to step S24.

In step S24, the electronic controller 62 drives the motor 40 without imposing any restriction and then ends processing. For example, the electronic controller 62 increases the assist level A in step S24. For example, the electronic controller 62 starts the motor 40 in step S24. As described above, in the present embodiment, a situation is simulated in which, for example, the human-powered vehicle 10 is moving from level ground or an uphill road onto a downhill road at the second vehicle speed V2. In such a situation, load is applied to the human-powered vehicle 10 in the positive direction with respect to the propulsion direction X1 to accelerate the human-powered vehicle 10. Additionally, the motor 40 is driven without any restriction to further accelerate the human-powered vehicle 10. Thus, the motor 40 of the present embodiment is effectively controlled.

The electronic controller 62 can cancel the unrestricted driving of the motor 40 in a case where a cancellation condition is satisfied after step S24. The cancellation condition is satisfied, for example, in a case where a predetermined time elapses after drive of the motor 40 is restricted or a case where the pitch angle DA becomes less than the second angle DA2.

Second Embodiment

Figure 7:
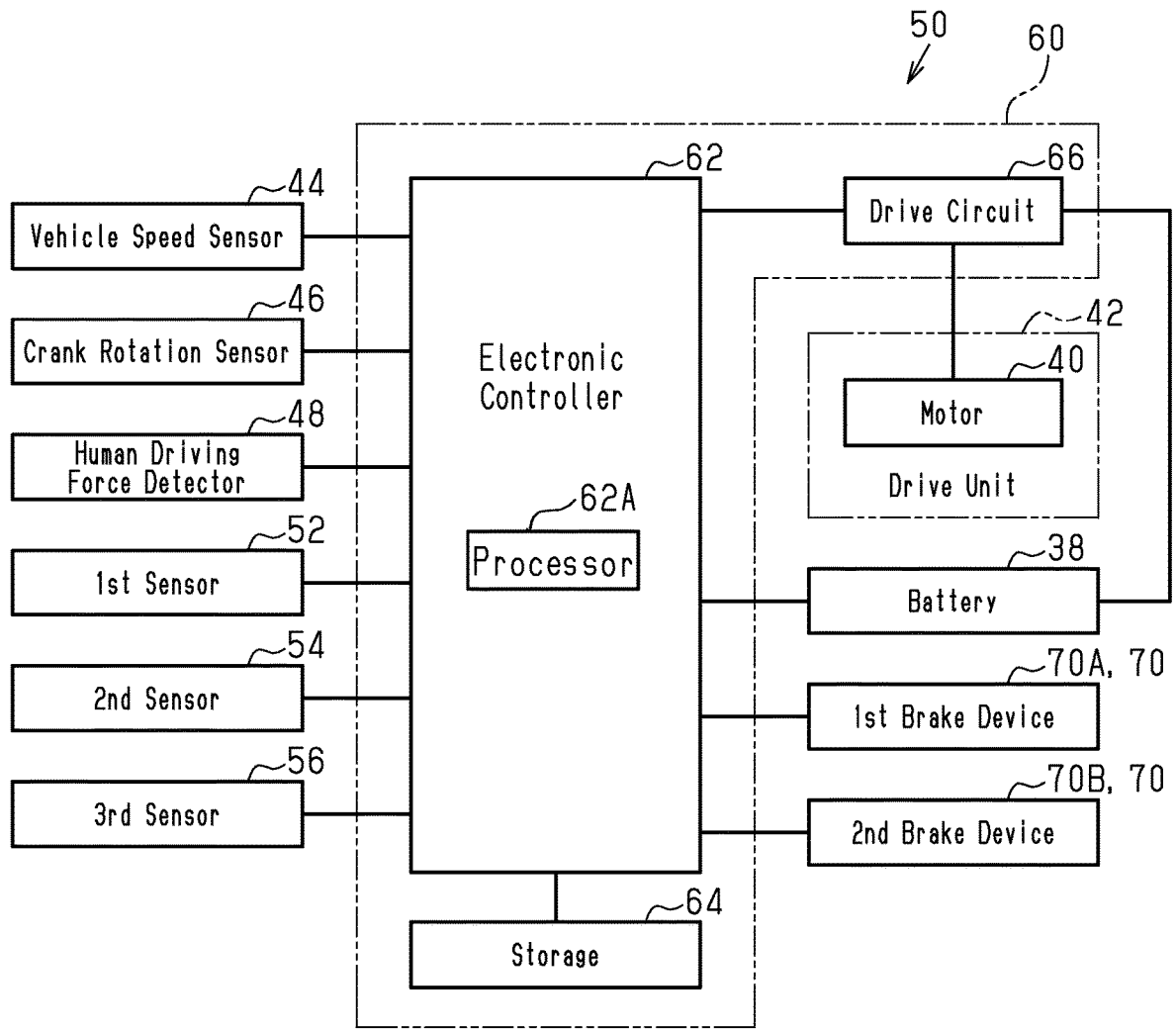
FIG. 7 is a block diagram showing the electrical structure of a human-powered vehicle (e.g., a bicycle) including a human-powered vehicle control device and a human-powered vehicle control system in accordance with a second embodiment.
Figure 8:
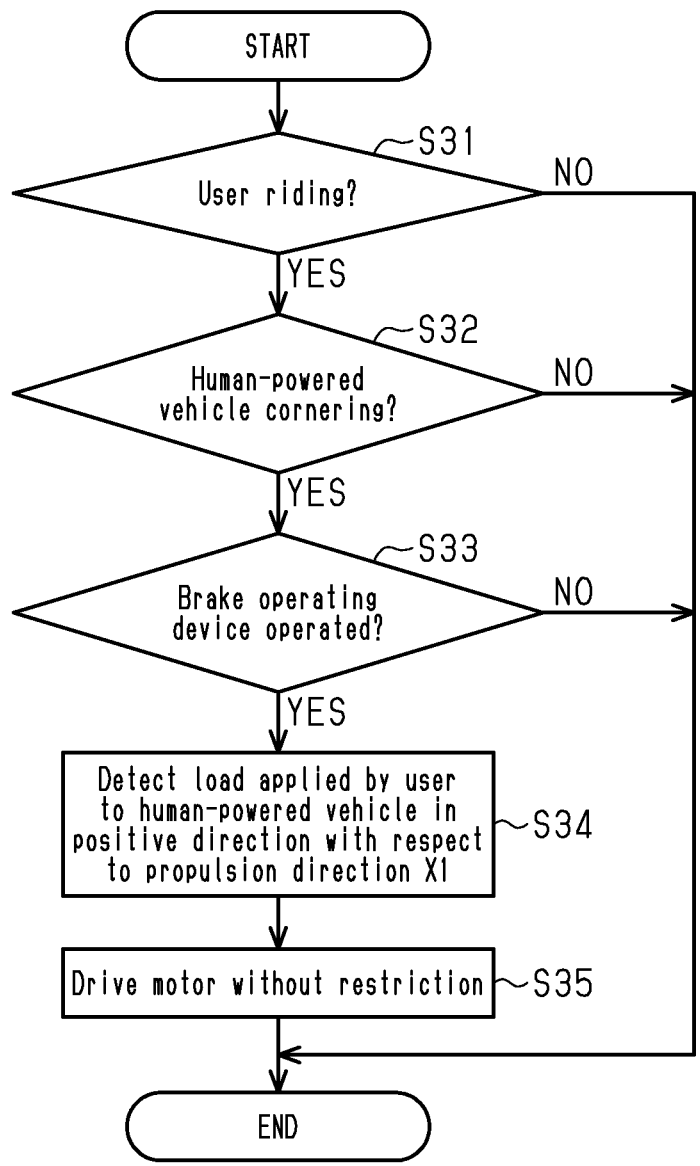
FIG. 8 is a flowchart illustrating a process executed by an electronic controller to control an assist motor in accordance with the second embodiment.

The control system 50 and the control device 60 in accordance with a second embodiment will now be described with reference to FIGS. 7 and 8. The control system 50 and the control device 60 of the second embodiment are the same as the control system 50 and the control device 60 of the first embodiment except in that the electronic controller 62 controls a brake device 70. Same reference numerals are given to those components in the control system 50 and the control device 60 of the second embodiment that are the same as the corresponding components of the first embodiment. Such components will not be described in detail.

The human-powered vehicle 10 includes the brake device 70. The brake device 70 applies brake force to the wheel 14. The brake device 70 can be a rim brake, a roller brake, or a disc brake. The brake device 70 includes an electric actuator. The brake device 70 can include a first brake device 70A that applies brake force to the front wheel 14F and a second brake device 70B that applies brake force to the rear wheel 14R.

The electronic controller 62 controls the brake device 70 of the human-powered vehicle 10. The electronic controller 62 controls the motor 40 in accordance with actuation of the brake device 70 of the human-powered vehicle 10.

In a case where the human-powered vehicle 10 is cornering, for example, the electronic controller 62 controls at least one of the motor 40 and the brake device 70 to increase the ground contact pressure of the front wheel 14F and decrease the ground contact pressure of the rear wheel 14R. Preferably, the electronic controller 62 determines whether the human-powered vehicle 10 is cornering in accordance with at least one of the roll angle DB of the human-powered vehicle 10 and the yaw angle DC of the human-powered vehicle 10. For example, the electronic controller 62 determines that the human-powered vehicle 10 is cornering in a case where at least one of the roll angle DB of the human-powered vehicle 10 and the yaw angle DC of the human-powered vehicle 10 is greater than or equal to a predetermined angle.

Preferably, the electronic controller 62 controls the motor 40 to increase the ground contact pressure of the front wheel 14F and decrease the ground contact pressure of the rear wheel 14R in a case where the human-powered vehicle 10 is cornering and the user operates a brake operating device to actuate the brake device 70. The electronic controller 62 can control the brake device 70 to increase the ground contact pressure of the front wheel 14F and decrease the ground contact pressure of the rear wheel 14R in a case where the human-powered vehicle 10 is cornering and the user operates a brake operating device to actuate the brake device 70.

A process executed by the electronic controller 62 to control the motor 40 will now be described with reference to FIG. 8. For example, in a case where electric power is supplied to the electronic controller 62, the electronic controller 62 starts the process of the flowchart shown in FIG. 8 from step S31. In a case where the process of the flowchart shown in FIG. 8 ends, the electronic controller 62 repeats the process from step S31 in predetermined cycles, for example, until the supply of electric power stops.

In step S31, the electronic controller 62 determines whether a user is riding the human-powered vehicle 10. In a case where a user is not riding the human-powered vehicle 10, the electronic controller 62 ends processing. In a case where a user is riding the human-powered vehicle 10, the electronic controller 62 proceeds to step S32.

In step S32, the electronic controller 62 determines whether the human-powered vehicle 10 is cornering. Step S32 is not essential. In a case where the human-powered vehicle 10 is not cornering, the electronic controller 62 ends processing. In a case where the human-powered vehicle 10 is cornering, the electronic controller 62 proceeds to step S33.

In step S33, the electronic controller 62 determines whether the brake operating device is operated. In a case where the brake operating device is not operated, the electronic controller 62 ends processing. In a case where the brake operating device is operated, the electronic controller 62 proceeds to step S34.

In step S34, the electronic controller 62 detects the user load applied by the user to the human-powered vehicle 10 in the positive direction with respect to the propulsion direction X1 of the human-powered vehicle 10 and then the proceeds to step S35.

In step S35, the electronic controller 62 drives the motor 40 without imposing any restriction and then ends processing. For example, the electronic controller 62 drives the motor 40 without imposing any restriction in accordance with the user load applied by the user to the human-powered vehicle 10 in the positive direction with respect to the propulsion direction X1 of the human-powered vehicle 10, which is detected in step S34. For example, the electronic controller 62 drives the motor 40 without imposing any restriction in a case where the user load applied by the user to the human-powered vehicle 10 in the positive direction with respect to the propulsion direction X1 of the human-powered vehicle 10, which is detected in step S34, is greater than or equal to a third load. If an ending condition is satisfied after step S35, the electronic controller 62 can return the motor 40 to the state prior to step S35. The ending condition is satisfied, for example, in a case where a predetermined time elapses after step S35 or a case where the human-powered vehicle 10 is no longer cornering. The third load can be equal to the second load.

In the present embodiment, in a case where the brake device 70 is actuated, an inertial force acts in the positive direction with respect to the propulsion direction X1 of the human-powered vehicle 10. As a result, load is applied from the user to the human-powered vehicle 10 in the positive direction with respect to the propulsion direction X1 of the human-powered vehicle 10 or in the pushing direction. The motor 40 in accordance with the present embodiment is effectively controlled, for example, in a case where the user actuates the brake device 70 to decelerate the human-powered vehicle 10 when the human-powered vehicle 10 is cornering and then attempts to accelerate the human-powered vehicle 10 as the human-powered vehicle 10 leaves the corner.

Modifications

The description related with the above embodiments exemplifies, without any intention to limit, applicable forms of a human-powered vehicle control device and a human-powered vehicle control system according to the present disclosure. In addition to the embodiments described above, the human-powered vehicle control device and the human-powered vehicle control system according to the present disclosure are applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

The electronic controller 62 can drive the motor 40 in a state in which the human driving force H is not input to the human-powered vehicle 10. In this case, for example, the electronic controller 62 can drive the motor 40 in step S24 of FIG. 6 even in a state in which the human driving force H is not input to the human-powered vehicle 10. However, there are regions prohibiting under regulations the execution of such a control that actually transmits driving force to the wheel 14.

In a case where a user is not riding the human-powered vehicle 10, the electronic controller 62 can control the motor 40 in accordance with the information related to the user load applied by the user to the human-powered vehicle 10 in the negative direction with respect to the propulsion direction X1 of the human-powered vehicle 10 or the information related to the user load in the pulling direction X2. In this case, step S11 can be omitted from the flowchart shown in FIG. 5. A case where a user is not riding the human-powered vehicle 10 includes, for example, a case where a user is walking the human-powered vehicle 10.

The electronic controller 62 can include an artificial intelligence processing unit. For example, an artificial intelligence processing unit executes at least part of the determination processes of the flowcharts shown in FIGS. 5 and 6.

Figure 5:
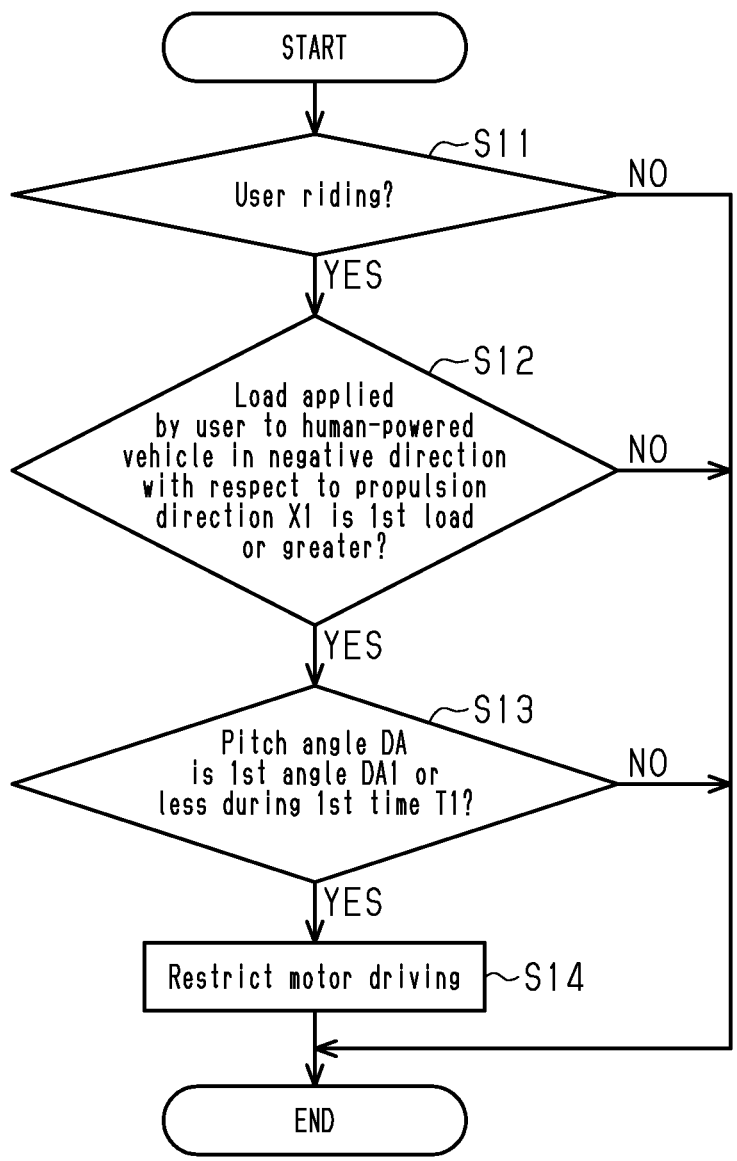
FIG. 5 is a flowchart illustrating a process executed by an electronic controller shown in FIG. 2 to control an assist motor.
Figure 6:
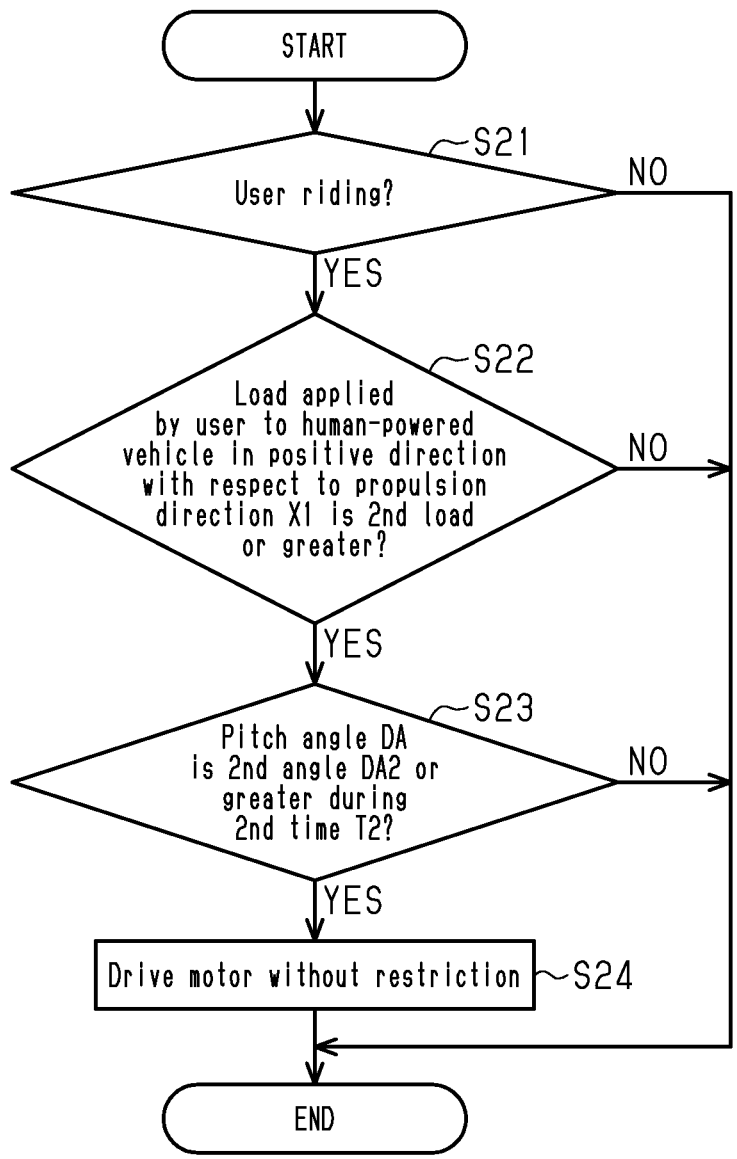
FIG. 6 is a flowchart illustrating a process executed by the electronic controller shown in FIG. 2 to control the assist motor.

The electronic controller 62 can combine and execute the processes of the flowcharts shown in FIGS. 5 and 6. The electronic controller 62 can execute the process of FIG. 5 and does not have to execute the process of FIG. 6. The electronic controller 62 can execute the process of FIG. 6 and does not have to execute the process of FIG. 5.

The control system 50 includes the electronic controller 62, the first sensor 52, and the second sensor 54. Further, the electronic controller 62 is configured to control the motor 40 in accordance with the information related to the user load in the pulling direction X2 detected by the first sensor 52 and the pitch angle DA of the human-powered vehicle 10 detected by the second sensor 54. Elements that are not necessary for the control system 50 to perform such control can be omitted.

The control system 50 includes the electronic controller 62, the first sensor 52, and the third sensor 56 that detects whether a user is riding the human-powered vehicle 10. Further, the electronic controller 62 is configured to control the motor 40 in accordance with the information related to the user load in the positive direction with respect to the propulsion direction X1 of the human-powered vehicle 10 detected by the first sensor 52 in a case where the third sensor 56 detects that a user is riding the human-powered vehicle 10. Elements that are not necessary for the control system 50 to perform such control can be omitted.

The control system 50 includes the electronic controller 62, the first sensor 52, and the third sensor 56 that detects whether a user is riding the human-powered vehicle 10. Further, the electronic controller 62 is configured to control the motor 40 in accordance with the information related to the user load in the pushing direction X3 detected by the first sensor 52 in a case where the third sensor 56 detects a user is riding the human-powered vehicle 10. Elements that are not necessary for the control system 50 to perform such control can be omitted.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device for a human-powered vehicle, the control device comprising:
    an electronic controller configured to control a motor that assists in propulsion of the human-powered vehicle,
    the electronic controller being configured to control the motor in accordance with a pitch angle of the human-powered vehicle and information related to a user load applied by a user to the human-powered vehicle in a negative direction with respect to a propulsion direction of the human-powered vehicle, the user load being applied by the user to at least one of a handlebar, a pedal, and a saddle of the human-powered vehicle,
    the electronic controller being configured to control the motor in accordance with the pitch angle of the human-powered vehicle and the information related to the user load.

2. A control device for a human-powered vehicle, the control device comprising:
    an electronic controller configured to control a motor that assists in propulsion of the human-powered vehicle in a propulsion direction,
    the electronic controller being configured to control the motor in accordance with a pitch angle of the human-powered vehicle and information related to a user load in a pulling direction applied by a user to the human-powered vehicle, the pulling direction being a direction in a range of directions spanning from a negative direction opposite the propulsion direction to an upward direction and the user load being applied by the user to at least one of a handlebar, a pedal, and a saddle of the human-powered vehicle,
    the electronic controller being configured to control the motor in accordance with the pitch angle of the human-powered vehicle and the information related to the user load.

3. The control device according to claim 1, wherein the electronic controller is configured to restrict drive of the motor in a case where the pitch angle of the human-powered vehicle is less than or equal to a first angle during a first time before a point of time at which the information related to the user load is detected.

4. A control device for a human-powered vehicle the control device comprising:
    an electronic controller configured to control a motor that assists in propulsion of the human-powered vehicle,
    the electronic controller being configured to control the motor in accordance with a pitch angle of the human-powered vehicle and information related to a user load applied by a user to the human-powered vehicle in a negative direction with respect to a propulsion direction of the human-powered vehicle, the electronic controller being configured to decrease output of the motor in a case where the pitch angle of the human-powered vehicle is less than or equal to a first angle during a first time before a point of time at which the information related to the user load is detected.

5. The control device according to claim 1, wherein
the electronic controller is configured to control the motor in accordance with the pitch angle of the human-powered vehicle and the information related to a load in a case where the user is determined to be riding the human-powered vehicle.

6. The control device according to claim 1, wherein
the electronic controller is configured to drive the motor in a case where the pitch angle of the human-powered vehicle is greater than or equal to a second angle during a second time before a point of time at which the information related to the user load is detected.

7. The control device according to claim 1, wherein
the electronic controller is configured to increase output of the motor in a case where the pitch angle of the human-powered vehicle is greater than or equal to a second angle during a second time before a point of time at which the information related to the user load is detected.

8. The control device according to claim 1, wherein
the electronic controller is configured to control the motor in accordance with information related to a user load applied by the user to the human-powered vehicle in a positive direction with respect to the propulsion direction of the human-powered vehicle in a case where the user is determined to be riding the human-powered vehicle.

9. The control device according to claim 8, wherein
the electronic controller is configured to control the motor in accordance with the information related to the user load applied by the user in the positive direction to at least one of a handlebar, a pedal, and a saddle of the human-powered vehicle.

10. The control device according to claim 1, wherein
the electronic controller is configured to drive the motor in a state in which a human driving force is not input to the human-powered vehicle.

* * * * *